(12) United States Patent
Schnitzer

(10) Patent No.: US 6,644,439 B2
(45) Date of Patent: Nov. 11, 2003

(54) TRANSMISSION FOR AN INTERNAL COMBUSTION ENGINE

(75) Inventor: Detlev Schnitzer, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 48 days.

(21) Appl. No.: 09/975,550

(22) Filed: Oct. 12, 2001

(65) Prior Publication Data

US 2002/0053489 A1 May 9, 2002

(30) Foreign Application Priority Data

Oct. 17, 2000 (DE) .......................... 100 51 356

(51) Int. Cl.⁷ .............................. F01M 1/12; F16N 7/26
(52) U.S. Cl. .................... 184/11.1; 184/11.2; 184/6.12; 184/106; 74/606 R
(58) Field of Search ............... 184/11.1, 11.2, 184/106, 6.12; 74/605, 606 R

(56) References Cited

U.S. PATENT DOCUMENTS

| | | | | |
|---|---|---|---|---|
| 1,225,840 A | * | 5/1917 | Mayer et al. ............... | 184/11.1 |
| 3,800,913 A | * | 4/1974 | Schmitt ..................... | 184/6.13 |
| 4,515,031 A | * | 5/1985 | Janson ....................... | 74/359 |
| 4,556,363 A | * | 12/1985 | Watanabe et al. .......... | 415/55.6 |
| 4,658,665 A | * | 4/1987 | Strinzel et al. ............. | 74/467 |
| 5,099,715 A | * | 3/1992 | Baiker ....................... | 74/606 R |
| 5,121,815 A | * | 6/1992 | Francois et al. ............ | 184/6.4 |
| 6,066,060 A | * | 5/2000 | Harper ...................... | 184/11.1 |

FOREIGN PATENT DOCUMENTS

| | | |
|---|---|---|
| DE | 35 16 710 | 11/1986 |
| DE | 36 30 973 | 3/1987 |
| DE | 198 56 941 | 2/2000 |
| DE | 198 47 533 | 4/2000 |
| DE | 199 12 327 | 9/2000 |

* cited by examiner

Primary Examiner—William C. Joyce
Assistant Examiner—Timothy McAnulty
(74) Attorney, Agent, or Firm—Klaus J. Bach

(57) ABSTRACT

In a transmission for an internal combustion engine including an oil sump and an oil pump operatively in communication with the oil sump, an oil reservoir is provided for receiving oil from the oil sump when the transmission is in direct drive and power is transmitted only through the main shaft of the transmission while the intermediate shaft is idling so that no friction is generated by the gears of the intermediate shaft being immersed in the oil of the oil sump.

11 Claims, 2 Drawing Sheets

TRANSMISSION FOR AN INTERNAL COMBUSTION ENGINE

BACKGROUND OF THE INVENTION

The invention relates to a transmission for an internal combustion engine including an oil sump and an oil pump for pumping oil from the oil sump through a lubricating circuit.

Transmissions for internal combustion engines with an oil sump and an oil pump for a main oil supply circuit are known in the art. For the parts of the transmission, which are immersed into the oil sump, lubrication is provided by the oil of the oil sump. For the parts of the transmission which do not extend into the oil sump, a main oil circuit is provided for lubrication. The main oil circuit includes an oil pipe and a pump operatively in communication with the oil sump and the oil pipe for supplying oil from the oil sump through the oil pipe to various lubricating points. The oil sump includes a predetermined amount of oil, which is constantly circulated by contact with the moving parts extending into the oil sump and by the oil pump.

It is the object of the present invention to provide a transmission in which the friction forces generated by operation of transmission parts immersed in the oil is minimized.

SUMMARY OF THE INVENTION

In a transmission for an internal combustion engine including an oil sump forming an oil reservoir and an oil pump operatively in communication with the oil sump, an additional oil reservoir is provided for receiving oil from the oil sump when the transmission is in direct drive and power is transmitted only through the main shaft of the transmission while the intermediate shaft is idling so that no friction is generated by the gears of the intermediate shaft being immersed in the oil of the oil sump.

With this arrangement, the oil level in the transmission can be adjusted dependent on the respective operating stages of the transmission. At any point, the oil level in the transmission can be reduced to avoid splash losses as much as possible.

To this end, it is advantageous if, in addition to the oil sump and the main oil circuit, at least one dry sump oil circuit is provided and the dry sump oil circuit is operatively connected to a main shaft and the main oil circuit is connected to the gears and/or the intermediate shaft and/or an oil cooling system. In this way, the transmission components which are disposed in the power transmission path, but which are not lubricated directly by the oil in the oil sump when the oil level is lowered, can still be lubricated as needed. It is furthermore possible to appropriately lubricate also those transmission components, which are always disposed above the oil sump.

It is furthermore advantageous to provide, in addition to the oil pump, at least a second oil pump or to provide a variable volume oil pump or at least a two stage oil pump wherein the pump ratio of the oil pump to the second oil pump or the ratio between the stages is between 1.3 and 3. The oil sump and/or the additional oil storage is operatively connected to at least one of the oil pumps. When the oil level is lowered, the dry sump circuit also has to be activated. With two oil pumps or, respectively, a two-stage oil pump, the oil level can be rapidly lowered while, at the same time, the dry sump circuit is supplied with oil. It is noted that the oil supplied to the dry sump circuit returns to the oil sump after lubricating the transmission components, that is, it acts in opposition to the lowering of the oil level in the oil sump. The pumping ratio should therefore assume the highest possible value so that the oil intake of the pump is substantially larger than the volume flow of the dry sump circuit, which returns again to the oil sump.

In connection with the present invention, it is particularly important that the oil reserve is limited or determined by at least a web or a wall arranged in the oil sump at the bottom of the transmission and that a controllable compensating valve is disposed between the oil sump and the oil reservoir.

When, after an oil level-lowering phase, the oil level is raised, oil can flow through the compensating valve connection so as to hasten the filling of the oil sump beyond that achievable by way of the pump. The compensation valve is arranged in this case within the web in order to facilitate the compensation flow between the oil reservoir oil and the sump.

In connection with the arrangement according to the invention, it is advantageous if at least one gear disposed in oil provides for movement of the oil in the sump toward the oil reservoir. In this way, a second pump is not necessary. The oil reservoir is constantly filled by the oil movement or pumping action of the shaft or gears. This pumping power is constant, so that, for filling the oil sump by way of the compensating valve or the pump, the transport volume of the gear can be compensated for. When the compensation valve is opened, the pumping of the gears has only a relatively small effect on the oil level in the oil sump, which is constantly filled by way of the compensation valve and the pump.

It is further advantageous if the second oil pump is in operational communication with the oil reservoir and the dry sump circuit is and the oil pump are in communication with the oil sump, and, by way of a valve, with the main oil circuit or with a supply line for the oil reservoir. When the oil level in the oil sump is at low levels, the second oil pump supplies oil to the dry sump circuit from the oil reservoir. The oil pump, which, at normal oil levels in the oil sump, supplies oil to the main oil circuit which has already been described, is employed to pump oil from the oil sump, to which the oil from the dry sump circuit returns, to the oil reservoir. Via the valve, the oil pump is either switched into the main oil circuit or into the supply circuit for supplying oil to the reservoir.

It is furthermore advantageous that the oil pump is in communication with the oil reservoir and, by way of the valve, with the main oil circuit and/or with the dry sump circuit. If only one oil pump is used, the oil reservoir is replenished by means of a gear. The oil pump is used for supplying oil from the oil reservoir to the dry sump circuit and/or the main oil circuit, depending on the position of the valve. The oil level in the oil reservoir is at least as high as that in the oil sump even when the compensation valve is open.

It is furthermore advantageous that, when the transmission is in direct gear or at an optimal operating point, the oil level in the transmission is lowered and part of the oil is supplied by the oil pump and/or the rotating gears into the oil reservoir. The constants and the main shaft are lubricated by way of the dry sump circuit. A main oil circuit, which is in communication with the gears and/or with the intermediate shaft and/or with the oil cooling system, is selectively inactive. Upon engaging a gear different from the direct gear, the oil reservoir is placed by the compensation valve in communication with the oil sump and the oil level in the oil reservoir is again raised. At the same time, the main oil circuit, which is in operational communication with the gears and/or with the intermediate shaft and/or the oil cooling system, is activated.

The invention will be described in greater detail below on the basis of the accompanying drawings:

DESCRIPTION OF PREFERRED EMBODIMENT

Figure 1:
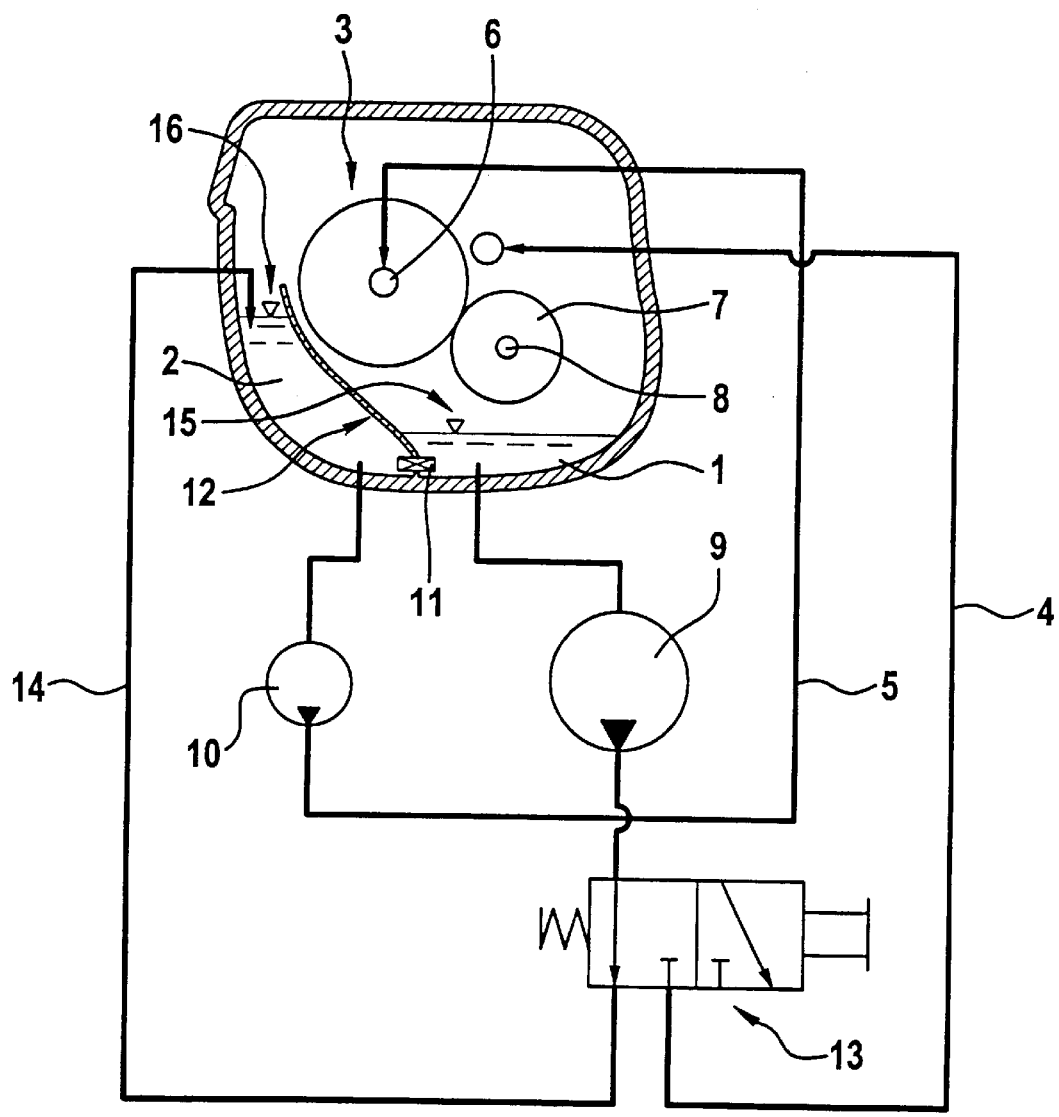
FIG. 1 shows, in principle, a transmission lubricating system with two separate dry sump circuits and two oil pumps.

As shown in FIG. 1, a transmission includes an oil sump 1 for the lubrication of a transmission component 3, that is, respectively, a gear 7 and a main shaft 6 and an intermediate shaft 8. The oil sump 1 is delimited by a bottom wall, side walls and end walls, which are not shown and also a separating web 12. The separating web 12 separates the oil sump 1 from the oil reservoir 2. The oil reservoir 2 is also delimited by the bottom wall of the transmission housing and side and end walls which are not shown.

In direct gear, that is, in an operating stage in which none of the gears of the intermediate shaft 8 are subjected to a load, oil is pumped out of the oil sump 1 by an oil pump 9. The oil taken out of the oil sump 1 is conducted to the oil reservoir 2 by way of an oil supply line 14. The oil pump 9 is in communication with a switchover valve 13, which establishes the flow circuit from the pump 9 to the oil reservoir 2. At the same time, oil is pumped out of the oil reservoir 2 by a pump 10 and supplied to a dry sump circuit 5. The dry sump circuit 5 provides lubricant essentially to the bear- ings of the main shaft 6 since power is transmitted through the main shaft 6 when the transmission is in direct drive. Consequently, a circuit is established between the oil reservoir 2, which is kept filled by the pump 9 by way of the dry sump circuit 5 to the transmission components 3, and, respectively, the main shaft 6. The oil dripping from the transmission components 3 is collected in the oil sump 1 and is then pumped by the pump to the oil reservoir 2.

Between the oil sump 1 and the oil reservoir 2, a flow passage with a compensation valve 11 is provided. When a gear other than the direct gear is engaged, that is the other transmission components 3 including the intermediate shaft 8 are at least, partially disposed in the power transmission path, the oil level 15 in the oil sump 1 is raised. To this end, the oil from the oil sump 1 is no longer pumped into the oil reservoir 2, but into a main oil circuit 4 by way of the valve 13. The oil is therefore removed from the reservoir 2 by the oil pump 10 to be supplied to the dry sump circuit 5 and no new oil is supplied to the reservoir 2 by the oil pump 9. As a result, the level 16 of the oil in the reservoir 2 is steadily lowered while the oil level 15 in the oil sump 1 steadily rises.

The main oil circuit 4 supplies lubricant to the intermediate shaft 8 and to all the transmission components 3 through which no power is transmitted when the direct gear is engaged and also to an oil cooler, which is not shown in the Figures. To speed up the oil level exchange between the oil reservoir 2 and the oil sump 1, the flow passage with the compensation valve 11 is provided. Upon disengagement of the direct gear, the compensation valve 11 is opened so that the oil levels in the sump 1 and in the oil reservoir 2 are equalized.

Figure 2:
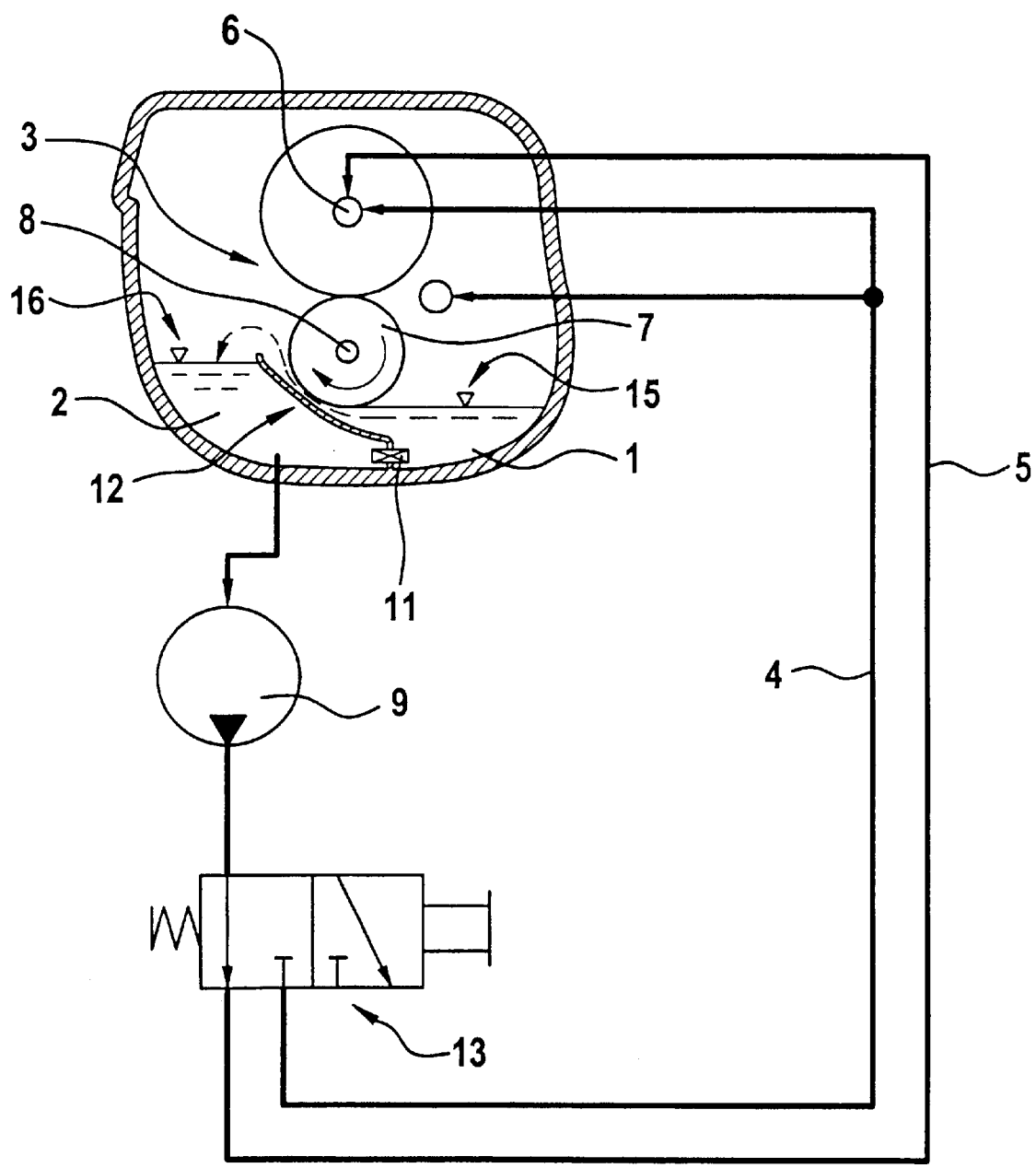
FIG. 2 shows another embodiment of a transmission lubricating system with two separate dry sump circuits and a single oil pump.

In the embodiment as shown in FIG. 2, the oil sump 1 is also separated from the oil reservoir 2 by a web 12. The web 12 is in this case so arranged that the transmission components 3 particularly the gears 7 constantly transport oil from the oil sump 1 to the oil reservoir 2 by their rotation. In direct gear, the oil reservoir is operatively in communication with the dry sump circuit 5 by way of the pump 9 so that the oil from the oil sump 1 is conducted by way of the pump 9 and the valve 13 to the lubricating points of the main shaft 6 through which power is transmitted. From there, the oil returns to the oil sump 1 and is moved by the rotating gears 7 back into the oil reservoir 2. The oil level 15 of the oil sump 1 is therefore kept at a minimum value which is at the bottom end of the rotating gears 7.

Between the oil reservoir 2 and the oil sump 1, there is again a passage in the web 12 including the equalization valve 11. In a gear other than direct gear, the equalization valve 1 is opened and the pump 9 is connected to the main oil circuit 4 by the switch-over valve 13. Consequently, oil flows from the reservoir 2 to the oil sump 1 by way of the equalization valve 11 while also the oil from the main oil circuit 4 is collected in the oil sump 1.

For this purpose, the oil pump 9 has at least-two pumping stages or power stages or a variable pumping volume because in the dry sump circuit the pumping efficiency or respectively, the volume flow is lower than in the main oil circuit. The output of the oil pump 9 is therefore increased in comparison with the output provided in direct gear. The pumping flow generated by the rotating gears 7 is small in comparison with the volume flow of the main circuit so that a continuous increase of the oil level 15 of the oil sump 1 is ensured.

What is claimed is:

1. A transmission for an internal combustion engine including a housing, a main shaft and an intermediate shaft rotatably supported in said housing and supporting gears and an oil lubricating system disposed within said housing and comprising an oil sump, an oil pump with a main oil circuit including an oil supply line for supplying oil to various parts of said transmission and an oil reservoir arranged in said housing and being in operational communication with said oil sump for storing oil in a direct gear operating state, in which no power is transmitted by way of said intermediate shaft, said oil supply line including a switch-over valve for selectively supplying oil to different parts of said transmission depending on the operating state of said transmission.

2. A transmission according to claim 1, wherein for the lubrication of said parts at least one dry sump circuit is provided in addition to said oil sump and said main oil circuit.

3. A transmission according to claim 2, wherein said dry sump circuit is in operational communication with constants and said main shaft and said main oil circuit is in operational communication with at least one of said gears and said intermediate shaft.

4. A transmission according to claim 3, wherein said reservoir and said sump are divided by a web having flow passages with a control valve for placing said reservoir in communication with said oil sump.

5. A transmission according to claim 4, wherein said oil pump has an inlet connected to said oil sump and an outlet with a supply line in communication with said reservoir for pumping oil from said oil sump to said reservoir.

6. A transmission according to claim 4, wherein said web is arranged adjacent to at least one gear of said intermediate shaft so as to permit said at least one gear to move the oil adjacent said at least one gear over said web and into said reservoir, said oil pump having an inlet connected to said reservoir and an outlet in communication with various lubricating points of said transmission.

7. A transmission according to claim 1, wherein at least a second oil pump is provided with a pumping ratio of said oil pump with respect to said second oil pump of between 1.3 and 3.

8. A transmission according to claim 7, wherein at least one of said oil pumps is in communication with at least one of said oil sump and said oil reservoir for receiving oil therefrom.

9. A transmission according to claim 7, wherein said second oil pump has an oil inlet connected to said reservoir and an outlet in communication with lubricating points of said main shaft.

10. A transmission according to claim 1, wherein said oil pump has a variable pumping volume.

11. A transmission according to claim 1, wherein said oil pump has at least two pumping stages.

\* \* \* \* \*